Figure 1:
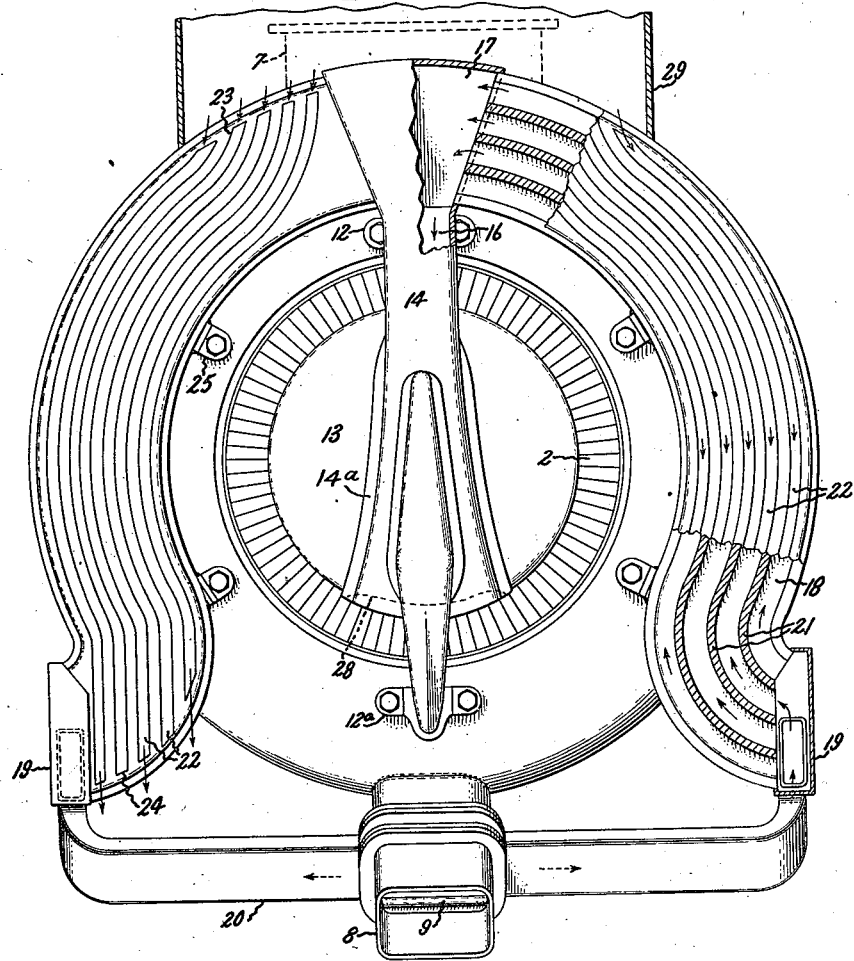

Aug. 1, 1944.   R. H. NORRIS   2,354,698
GAS TURBINE
Filed March 6, 1942   2 Sheets-Sheet 1

Inventor:
Rollin H. Norris,
by Harry E. Dunham
His Attorney.

Aug. 1, 1944.   R. H. NORRIS   2,354,698
GAS TURBINE
Filed March 6, 1942   2 Sheets-Sheet 2
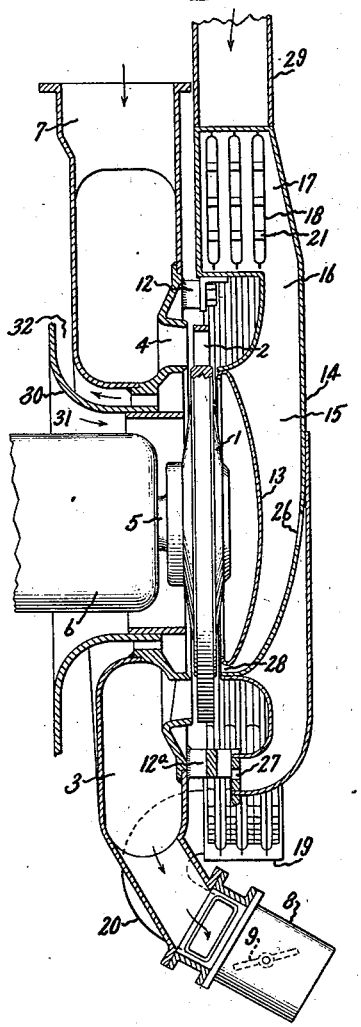
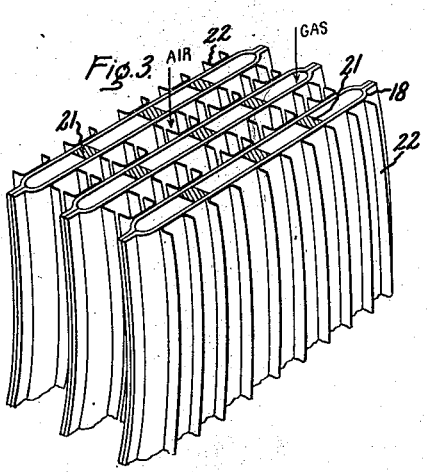
Inventor:
Rollin H. Norris,
by Harry E. Dunham
His Attorney.

Patented Aug. 1, 1944

2,354,698

UNITED STATES PATENT OFFICE 2,354,698

GAS TURBINE

Rollin H. Norris, Schenectady, N. Y., assignor to General Electric Company, a corporation of New York Application March 6, 1942, Serial No. 433,626

2 Claims. (Cl. 60—41)

The present invention relates to gas turbines used for driving superchargers on aircraft wherein the gases used to actuate the turbine are exhaust gases of an aircraft engine, although the invention is not limited thereto necessarily.

The object of my invention is to provide an improved cooling means for the wheels of such turbines, and for a consideration of what I believe to be novel and my invention, attention is directed to the following specification and the claims appended thereto.

In the drawings, Fig. 1 is a face view, with parts broken away, of a gas turbine wheel provided with cooling means embodying my invention; Fig. 2 is a vertical sectional view thereof, and Fig. 3 is a detail perspective view of a part of a cooler or heat exchanger.

Referring to the drawings, 1 indicates the disk of a turbine wheel of a gas turbine and 2 indicates the buckets which are carried by the rim of the disk and to which exhaust gases are supplied from an annular nozzle box 3 by a ring of nozzles 4. The turbine wheel is carried on a shaft 5 mounted in a bearing 6. Gases are supplied to the nozzle box through a conduit 7 which may lead from the exhaust manifold of an aircraft engine. At 8 is a waste gate conduit connected to the nozzle box and provided with a waste gate valve 9. The turbine wheel may drive any suitable load (not shown). In the case of a supercharger, it may drive a centrifugal compressor which supplies air to the intake of an aircraft engine, to a cabin, or to other desired point of consumption.

The construction so far described is a known one and is to be taken as typical of any suitable gas turbine or turbo-supercharger. In operation, gases are supplied through conduit 7 to the nozzle box whence they are directed by nozzles 4 against the buckets 2 of the turbine wheel. Such a turbine is controlled usually by means of a waste conduit 8 which connects directly with atmosphere and in which is a regulating waste gate valve 9. When valve 9 is fully open, the gases may escape directly to atmosphere so that little, if any, gas flows through the nozzles to the turbine wheel. This represents no load operation. As the waste gate valve 9 is gradually closed, pressure is built up in the nozzle box and more and more gases are directed through the nozzles to the turbine wheel, fewer gases escaping to atmosphere.

According to my invention, I cool the turbine wheel by discharging against it gases, for example, exhaust gases, which have been previously cooled. In other words, I take some of the gases either before or after they have done work on the turbine wheel, cool such gases, and then direct such cooled gases directly against the turbine wheel. The gases may be cooled in any suitable way. In the case of an aircraft, they may be cooled by air from the slip stream by means of a suitable heat exchanger or cooler.

By utilizing cooled gases for cooling the turbine wheel, I am enabled to discharge the cooled gases directly against the turbine wheel, an arrangement which gives most efficient cooling, and at the same time avoid afterburning, i. e., burning of any unconsumed fuel in the gases due to air becoming mixed with the hot gases as they are supplied to or issue from the turbine wheel buckets, a thing which may occur when air is used as the cooling medium and is discharged directly against the turbine wheel for cooling it. Afterburning is objectionable not only because, if it occurs adjacent to the wheel, it serves to heat the wheel but also, in the case of aircraft, because the burning forms a torch visible at night.

Mounted on the nozzle box by means of suitable upper and lower supports 12 and 12ª is a cooling cap comprising an annular wall 13 across the central portion of which extends an outer wall 14 which is joined to the inner wall along its edge, it being provided with a flange 14ª suitably attached to wall 13. Wall 14 defines with the adjacent wall 13 an enclosed cooling chamber 15. Wall 13 is circular and is dished outwardly as shown in section in Fig. 2. Its peripheral edge lies adjacent to the rim of the turbine wheel disk. Connected with chamber 15 by a conduit 16 is a header 17 which is located beyond the periphery of the turbine wheel. Header 17 is connected on each side by a plurality of spaced flattened curved cooling tubes 18 to a pair of headers 19 which in turn are connected by pipes 20 to waste gate conduit 8 in advance of waste gate valve 9. Tubes 18 are curved around and conform generally to the contour of the cooling cap as shown in Fig. 1 and the walls of each tube are held in spaced relation to each other by spacers 21 which are located inside the tubes and extend preferably throughout the length of the tubes. In the present instance, three cooling tubes 18 are shown but a greater or lesser number may be used as found desirable. In the spaces between the tubes and on the outer surface of the two outside tubes are cooling fins 22 which are formed from U-shaped strips with the center of the U suitably attached to the tubes. At their upper ends, as viewed in Fig. 1, the admission end for cooling air, the fins are curved to face outwardly as is indicated at 23 and at their lower ends, the exhaust end for cooling air, they are adapted to face downwardly, as indicated at 24. The edges of opposed fins may be in part or wholly in engagement with each other to assist in holding the flattened tubes 18 in spaced relation to each other. Headers 17 and 19 and the cooling tubes connecting them form a unitary structure which is attached to the nozzle box by pipes 20, supports 12 and 12ᵃ and by additional suitable supports 25. This unitary structure constitutes a cooler or heat exchanger which may be considered as comprising two sections, one on each side of the cooling cap.

Lower support 12ᵃ is in the form of a hollow post, the interior of which is connected to cooling chamber 15 by an opening 26. At its lower end, the post is provided with an opening 27. This permits the flow of cooling medium through the post to cool it.

On the side of the cooling chamber opposite header 17 the cooling chamber walls are shaped to define an elongated slot 28 through which the cooled gases are discharged against the rim of the wheel for cooling it.

In the case of an aircraft, the cooling medium for cooling the gases prior to their being used to cool the turbine wheel will be air taken from the slip stream. To this end, a suitable conduit 29 may be provided for directing air from the slip stream to the cooler or heat exchanger.

In operation, gases from waste conduit 8 flow through pipes 20 to headers 19 and thence through tubes 18 to header 17. At the same time cooling medium, for example, cooling air, flows down through the spaces between the tubes and around the cooling fins 22 to cool the gases so that by the time the gases reach header 17 they have been cooled to a suitable lower temperature. From header 17, the cooled gases flow to chamber 15 from which they are discharged through slot 28 against the rim of the turbine wheel to cool the wheel. The cooling cap covers the wheel disk and has close clearance with the rim of the disk. It serves to protect the disk from hot exhaust gases issuing from the ring of buckets. Also, the cooled gases in flowing through chamber 15 absorb heat from the wheel disk through wall 13.

As pointed out above, the use of cooled gases to cool the turbine wheel has substantial advantages in that the cooling medium does not supply oxygen to the gases discharging from the turbine wheel, a thing which, as pointed out above, may cause afterburning. In this connection, it will be understood that in connection with a turbine of the type illustrated exhaust gases discharge directly to atmosphere.

While I have illustrated my invention as applied to only one side of the turbine wheel, i. e., to what may be termed the outer side, I may, if found desirable, utilize a similar arrangement for supplying cooling medium to the inner side of the turbine wheel for cooling the wheel from that side also. For example, referring to Fig. 2, I may provide a suitable curved annular partition wall as is indicated at 30 to define an annular passage 31 for the admission of cooling medium and an annular passage 32 for the discharge of cooling medium and by a suitable conduit (not shown) I may supply cooled gas to annular passage 31, such cooled gas flowing across the bearing and through annular passage 31 into contact with the inner surface of the wheel, thence radially outward and then out through annular passage 32.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a gas turbine wheel, a nozzle box for supplying gases thereto, a heat exchanger surrounding the turbine wheel, means for directing cooling medium through the heat exchanger and gases from the nozzle box through the heat exchanger, the cooling medium serving to cool the gases, and means for directing the cooled gases against the turbine wheel to cool it.

2. In combination, a gas turbine wheel, a nozzle box for supplying gases thereto, a cooling cap located on the discharge side of the wheel, a heat exchanger having sections extending along opposite sides of the cooling cap, means for supplying gases from the nozzle box to the heat exchanger, means for conveying cooled gases from the heat exchanger to the cooling cap, and means for effecting the discharge of cooled gases from the cooling cap against the turbine wheel to cool it.

ROLLIN H. NORRIS.